July 8, 1952     G. W. DODGE     2,602,379
BEATER
Filed Oct. 9, 1945     8 Sheets-Sheet 5
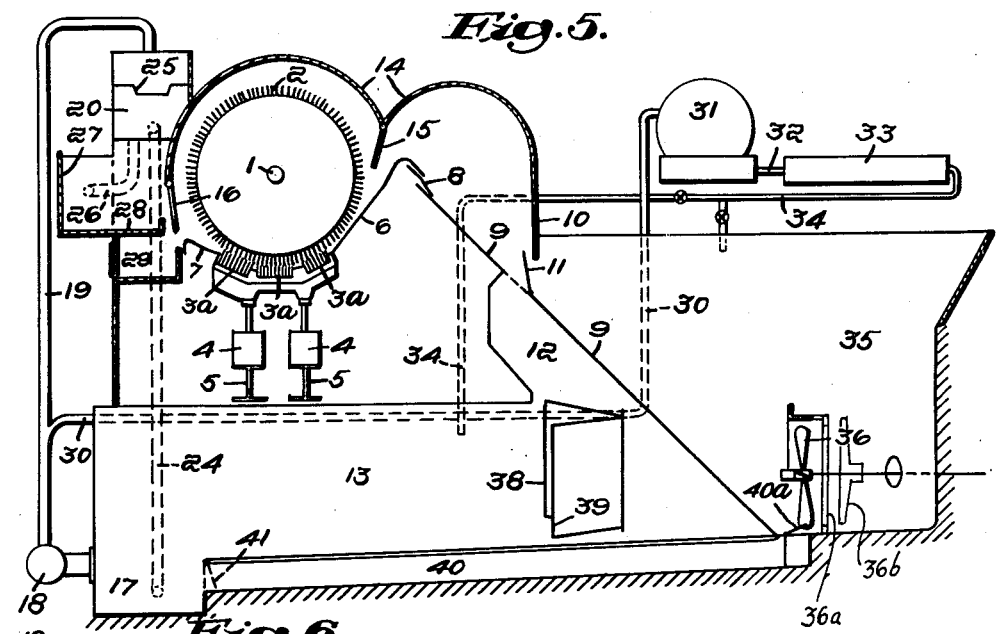
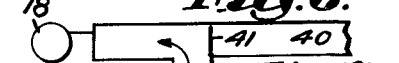
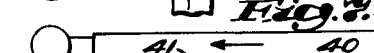
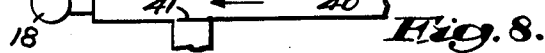
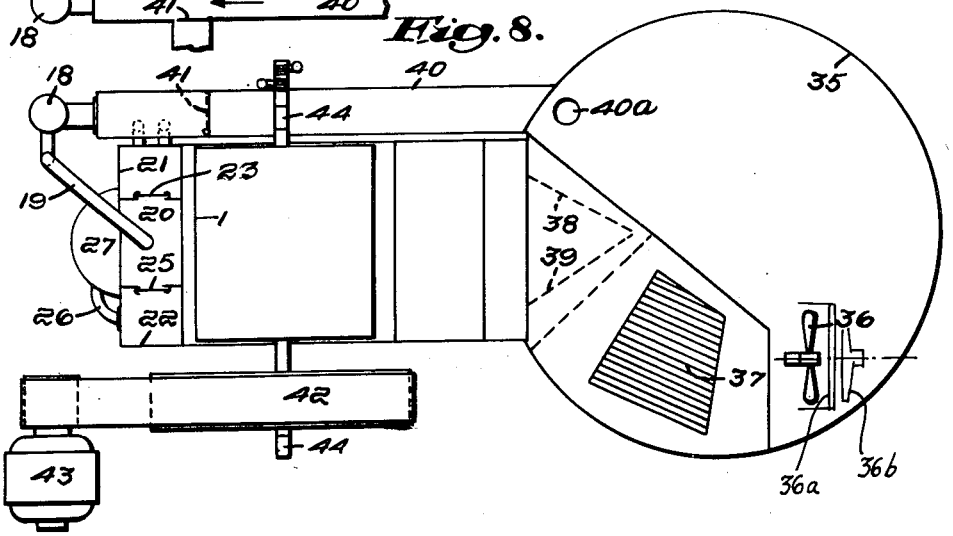
Inventor:
George W. Dodge,
by Geo. B. Rawlings.
Attorney July 8, 1952  G. W. DODGE  2,602,379
BEATER
Filed Oct. 9, 1945 8 Sheets-Sheet 6

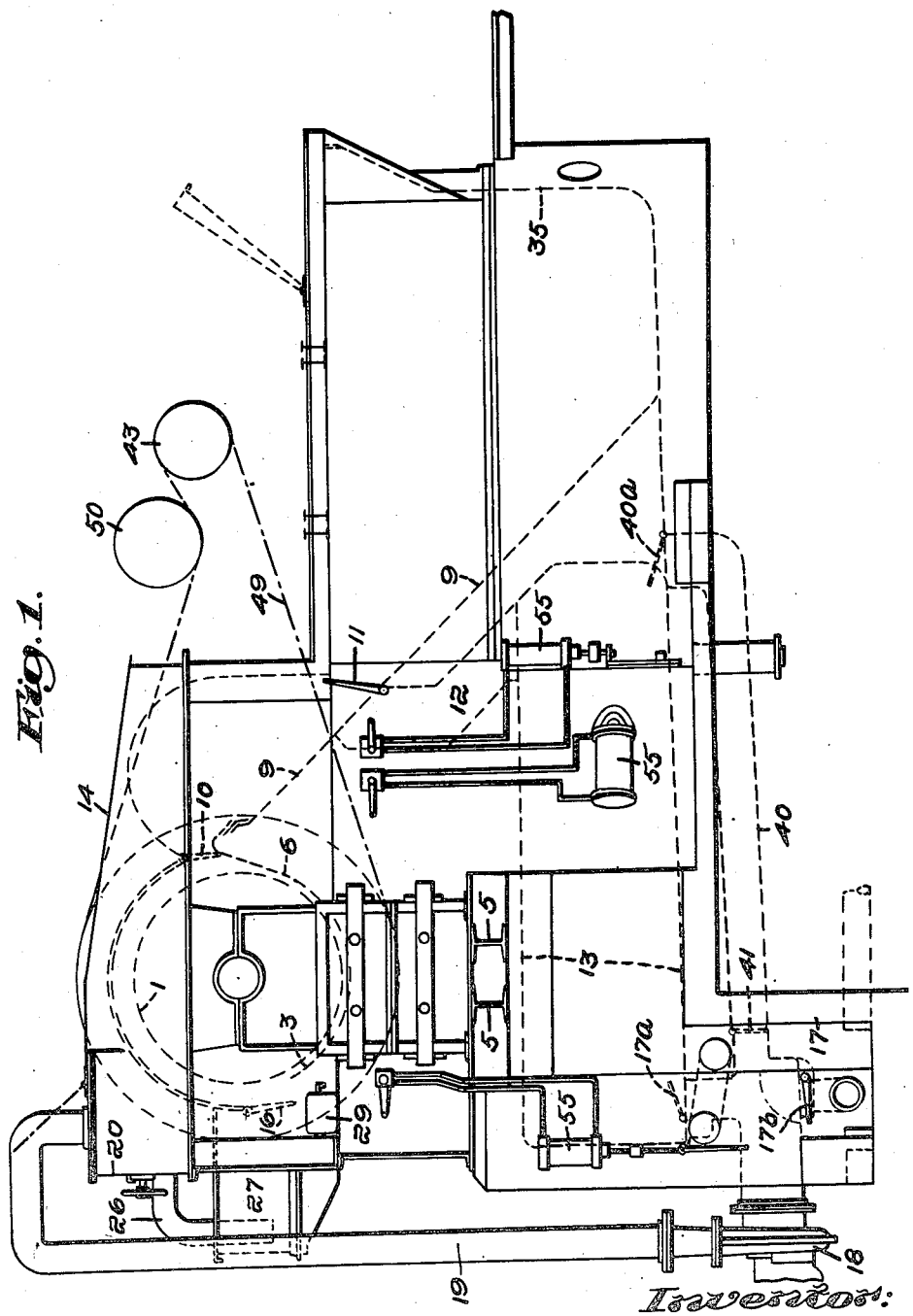

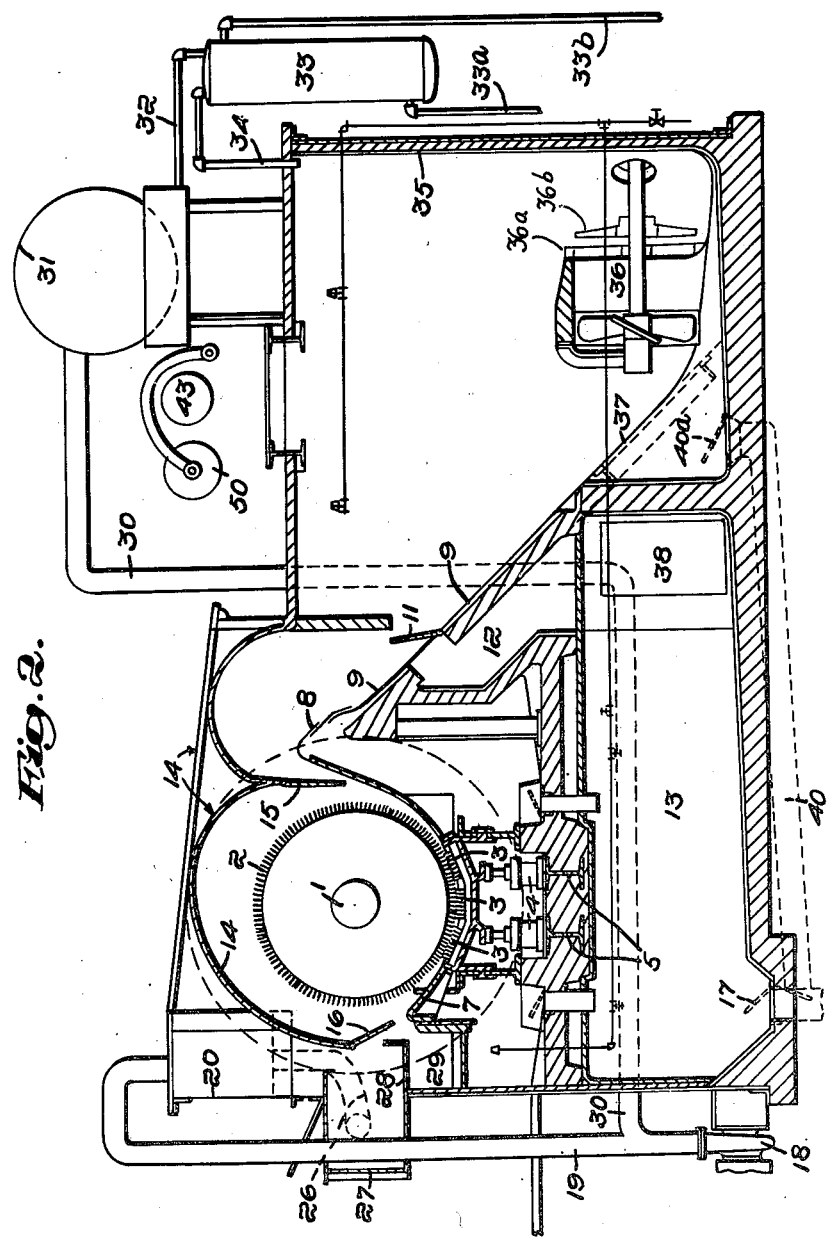

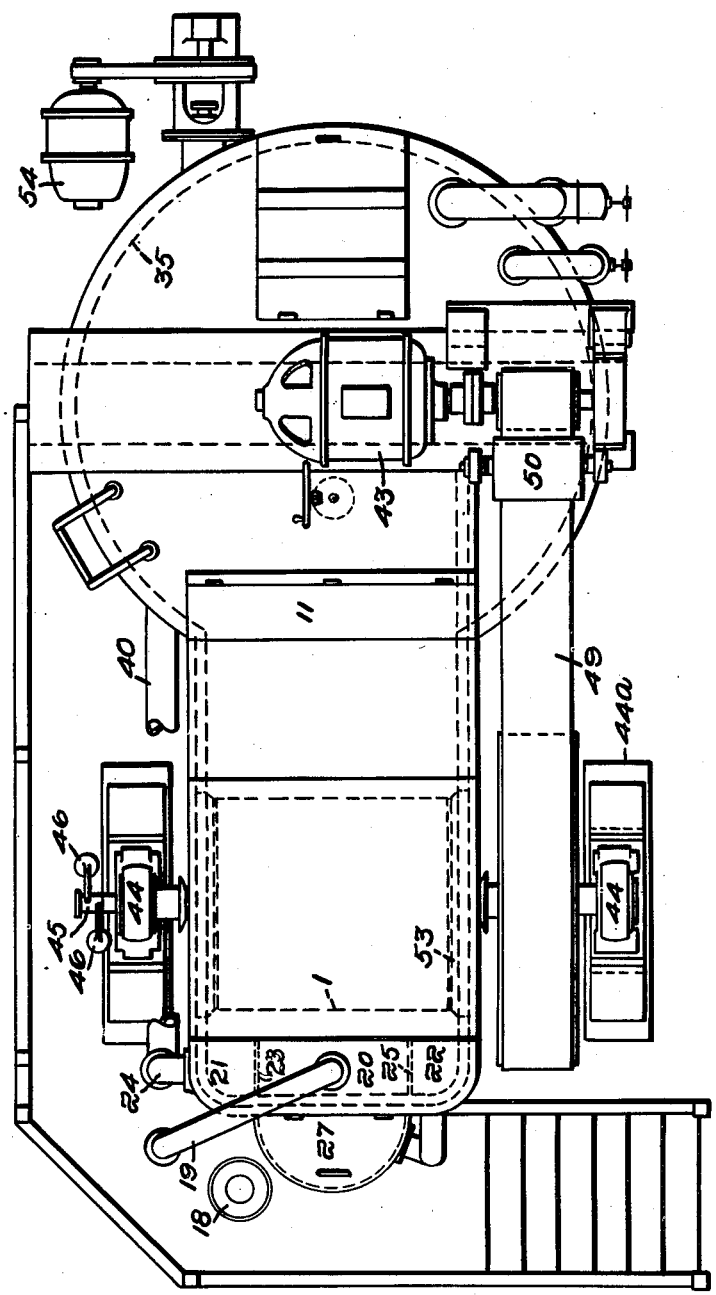

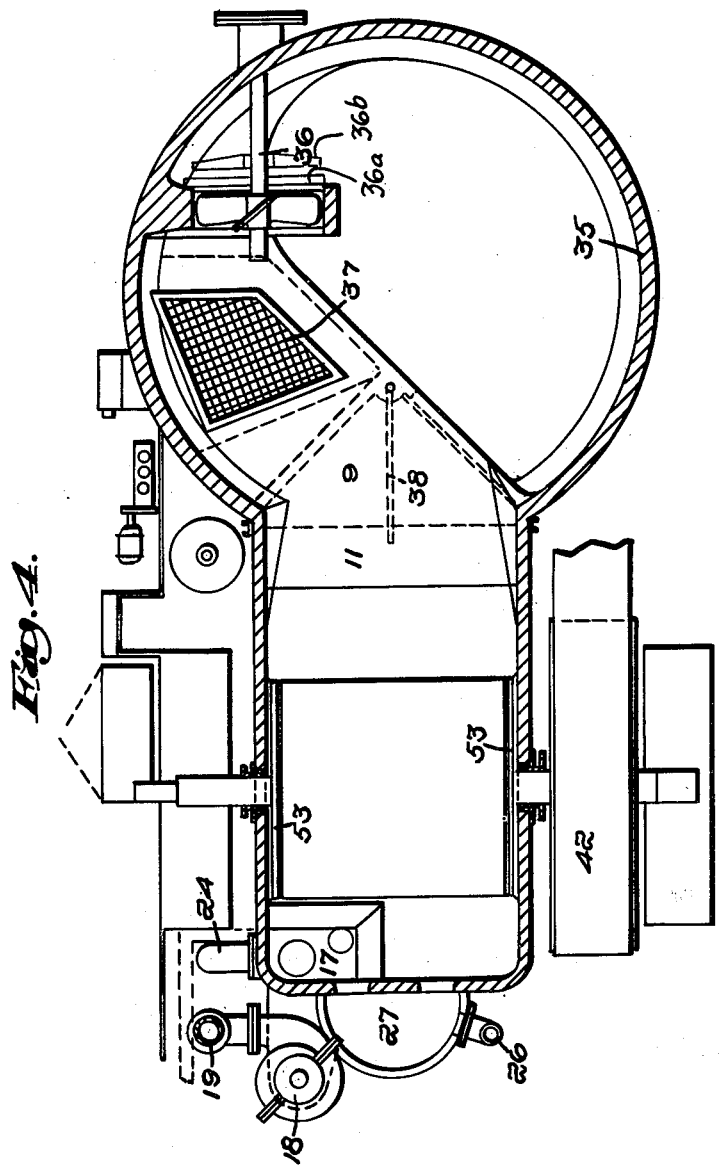

Inventor:
George W. Dodge,
by Geo B Rawlings.
Attorney

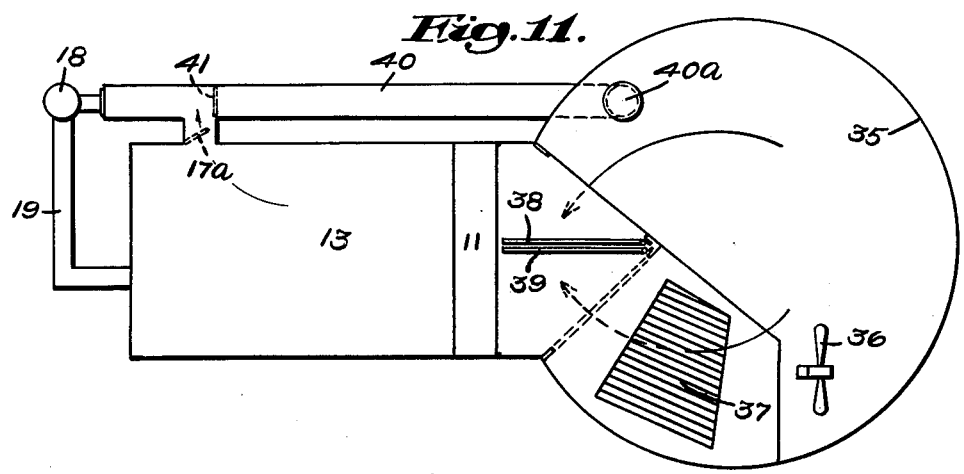
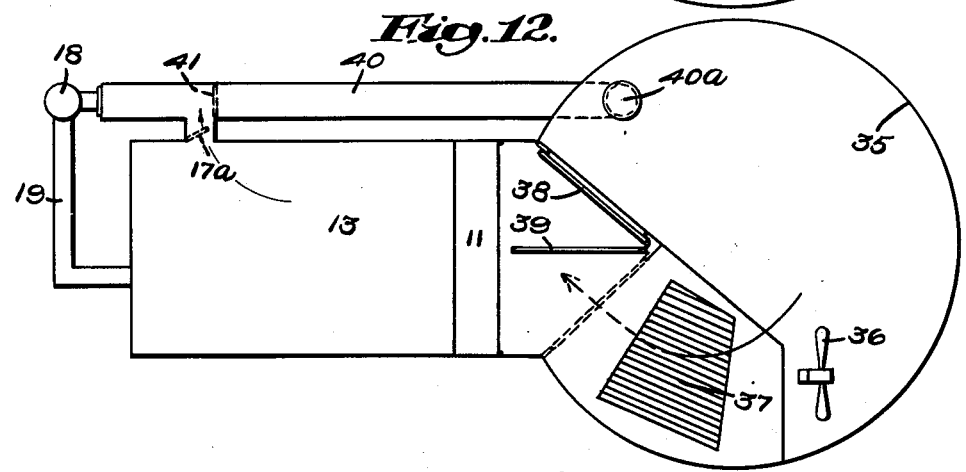
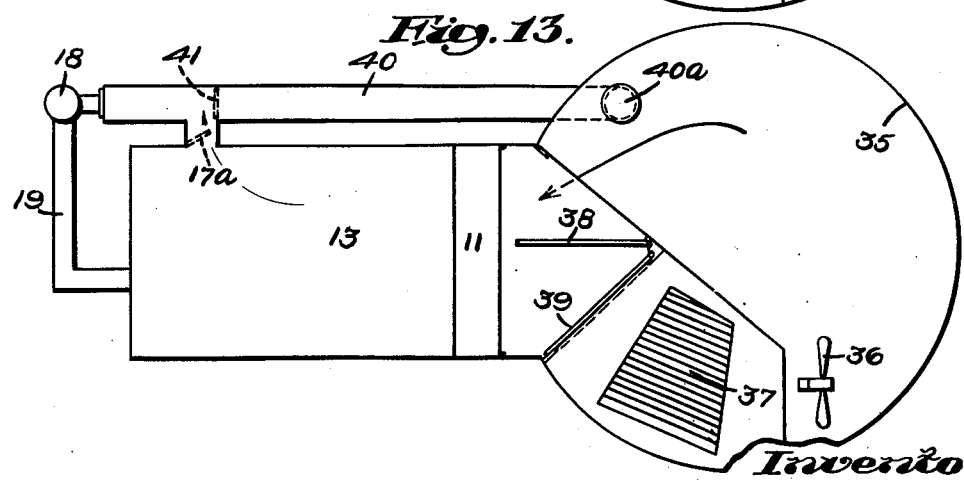

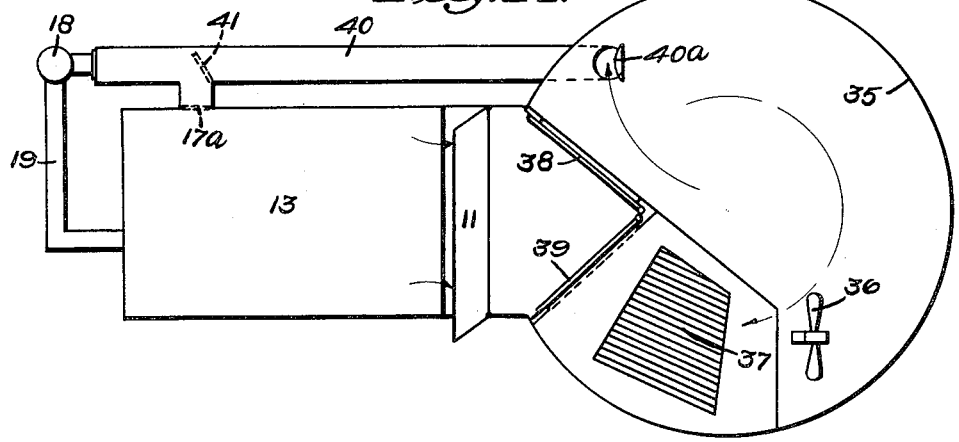
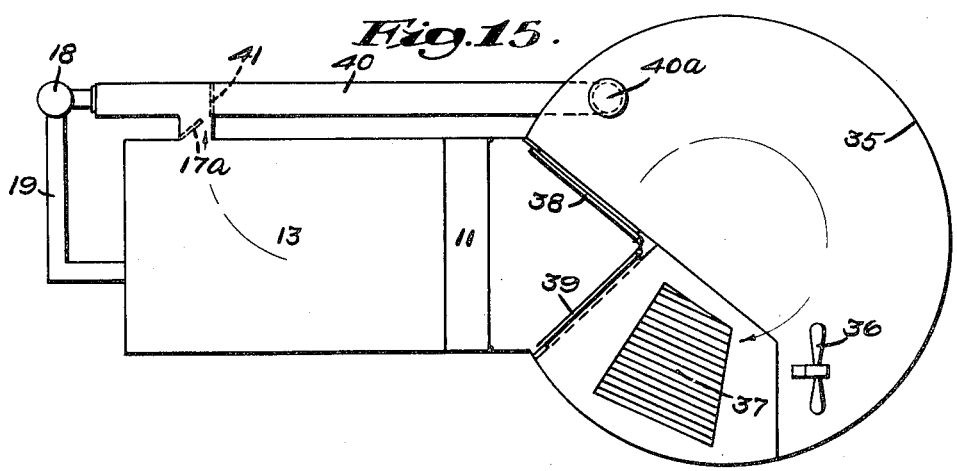

Patented July 8, 1952

2,602,379

UNITED STATES PATENT OFFICE 2,602,379

BEATER

George W. Dodge, Hoosick Falls, N. Y., assignor to The Noble & Wood Machine Company, Hoosick Falls, N. Y., a corporation of New York Application October 9, 1945, Serial No. 621,259

1 Claim. (Cl. 92—22)

This invention relates to paper stock beaters and more particularly to novel beater construction whereby the component raw materials of paper stock may be treated separately in various ways in a single machine and blended in accurate proportions under controlled conditions of temperature, consistency, hydraulic shear, and pressure.

Recent laboratory researches in the preparation of paper stock have indicated the value of numerous new preparation techniques, but hitherto, beating machinery has been incapable of putting such techniques to practice on a commercial scale. For instance, it has been demonstrated that the forces of hydraulic shear acting upon the stock during its circulatory path are important in the reproduction of stock having uniform characteristics. In conventional beaters, conditions of wear give rise to changing conditions of hydraulic shear rendering it impossible to duplicate runs made with the beater before such wear.

Another factor of importance is temperature. It has been found that certain deleterious chemical reactions take place in the preparation of, for instance, 100% rag stock if its temperature is permitted to rise above 120° F. Temperature in numerous other instances has been demonstrated to be critical; however, present day beaters are incapable of proper regulation of temperature. Cooling coils in the stock path are impractical for two reasons; first they introduce undesirable conditions of hydraulic shear, and second, the presence of the fibrous mass in the stock prevents adequate transfer of the heat to the coils by convection. Furthermore, dewatering the stock for the purpose of re-introduction of cool water may be undesirable because it depletes the stock of important ingredients dissolved in the water.

Other limitations in present day beaters standing in the way of commercial application of laboratory techniques concern the variability of treating operations. For instance, if it is desired to prepare a mixture of sheet or lapped pulp and a pulp requiring only easy beating, the present day beaters are incapable of handling it in a single unit. Preliminary equipment is required to break the coarser stock. Furthermore, when a mixture of sulphite and soda pulp is desired, it has been found that a substantial saving in the more expensive sulphite pulp can be made by beating it separately while the soda pulp is merely circulating in a stock tub. Another example of the variability desired in beaters is in the preparation of high grade rag content papers. In this latter instance, it is often desirable to partially reduce rag half stuff, and separately to break lap pulp in small quantities and in varying proportions; and then to further treat, size and color them in combination. Other important variables include the degree of consistency of the stock and the pressures between the cutting elements of the beater as well as the hydraulic pressures in the stock line. However, conventional beaters are incapable of changing operations to control such variables.

Accordingly, an important object of my invention is to provide a commercial size beater wherein the operations of beating, mixing, breaking, screening, circulating, washing, and dewatering may be accomplished alone or in various combinations at the will of the operator, and all under controlled conditions of temperature, hydraulic shear, consistency and pressure. Another object of my invention is to provide such a beater in which conditions of hydraulic shear in the stock circulatory path may be duplicated despite substantial wear upon the beater roll or bed plate filling.

Among the features of my invention is the combination and interconnection in a single machine of a beater roll and bed plates, a breaking and mixing unit, a stock chest, a variable stock thickener, washer and dewaterer, and a heat exchanger. These units are provided with suitable cross connections, valves, pumps, stock gates, deflectors and screens, whereby all the important variables in the beating process may be controlled.

It is a feature of my invention that the pressure between the beater roll and bed plates may be controlled, and the conditions of hydraulic shear adjacent to the beater roll and bed plates may be maintained constant despite conditions of wear, by mounting the bed plates, front approach and back fall all on a solid cradle, and supporting the cradle for vertical movement towards and away from the beater roll. A further feature of my invention is the provision of a gradually converging discharge throat for the stock after its exit from between the beater roll and the bed plates, whereby the stock is subjected to a gradual change in direction as it discharges from the beater roll, without using the energies supplied to create undue pressures and thereby excessive hydration. In order to account for wear of both the beater roll and bed plates, and provide uniform entrance and exit paths, the bed plate is further adjustable vertically with respect to the above mentioned cradle.

Temperature and consistency control are accomplished by a dewatering cylinder for extracting water from the stock and a heat exchanger to cool the water so extracted. After cooling, the extracted water may be returned to the stock as desired.

Another feature of my invention is the use of an adjustable stock doctor so designed and located as to divert a portion of the stock back over the beater roll and to return the remaining portion of the stock to the beater chamber for recirculation. By thus diverting a portion of the stock over the beater roll, it will be subjected to further beating. Such stock will also have sufficient kinetic energy to act as an accelerating medium to the slow moving stock being separately fed to the bed plates and beater roll. While capable of being set to divert any desired quantity of stock the preferred design of my stock doctor is one which will divert approximately one-third of the stock back over the beater roll and permit two-thirds of the stock to pass over the back fall into the pulp mass in the beater chamber for recirculation.

As a result of this design my beater enables numerous important function to be accomplished independently in a single unit. Among such are that the sheet of lapped pulp may be broken without injury to the roll or bed plate tackle; that mixed furnishes of hard and easy beating stock may be treated separately with maximum fibre development of each grade and without detriment to either grade; that the circulation and treatment of fibres may be regulated and controlled without regard for the batch size or the stock level in the beater; that the pressures between the beater roll and bed plates are positively controlled and may be of any degree, irrespective of the dead weight of the beater roll itself; and that mixed furnishes, colors, or chemicals, may be positively blended at the proper time with one another.

With my beater, the stock treatment may be varied from a quick opening of the fibres with little hydration, to a sharp quick cutting action, or the treatment may be slow and gradual where maximum hydration is wanted. Due to the system of controls any desired result may be had according to charts set up by the stock control laboratory and exactly duplicated batch by batch in the commercial operation of the beater.

Further objects and features of my invention will best be understood and appreciated from a detailed description of a preferred embodiment thereof selected for purposes of illustration and shown in the accompanying drawings in which:

Fig. 1 is a side elevation of my beater,

Fig. 2 is a longitudinal section thereof,

Fig. 3 is a top plan view,

Fig. 4 is a horizontal sectional plan,

Figure 9:
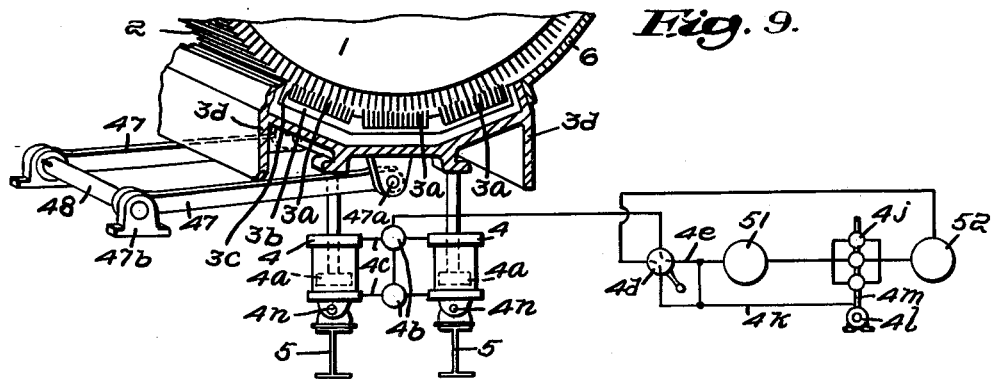
Figure 10:
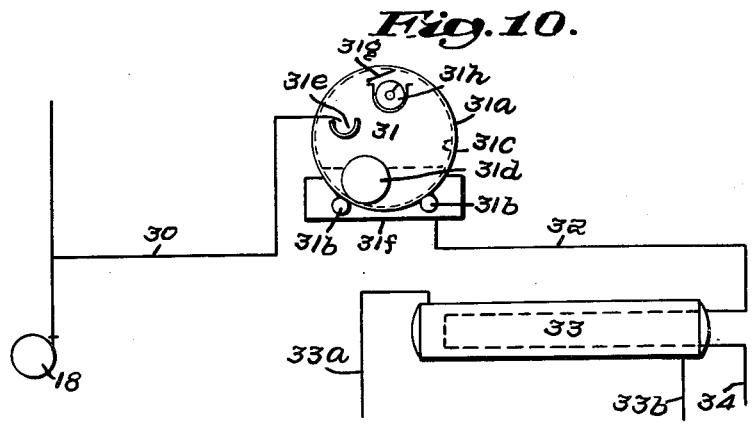

Fig. 5 is a longitudinal section showing flow to and from washer and heat exchanger, Figs. 6 and 7 show different positions of the valve controlling the flow of stock to the stock pump, Fig. 8 shows the pipe and valve connections from the stock pump to the beater chamber, Fig. 9 is a detail view showing the mechanism for adjusting the bed plate relative to the beater roll, Fig. 10 is a diagrammatic view of the dewatering cylinder and heat exchanger, and Figs. 11 to 15 inclusive are stock flow diagrams.

The beater roll 1 may be of cast iron, fabricated steel or any other material or construction best adapted to the specific work and results desired and filled in the conventional manner.

The beater roll is comprised of a body and shaft 1 and filling 2, and may be driven by means of customary power transmission, which may be flat belt, V-belts, silent chain, or gearing. As here shown, it is driven by means of a wound-rotor motor 43, flat belt 49, belt-tension control 50 and beater pulley 42. With this type of drive, it becomes possible to rotate the beater roll 1 at such different speeds as may be found desirable in the preparation and beating of different grades of raw material or stock.

Beater roll 1 is provided with end cover plates and banger irons of the conventional type which afford a means of protecting the stock from contamination, due to rust or foul stock.

The bed plate assembly consists of one or more groups of bars (see Fig. 9), these groups being generally called bed plates 3a which may be a combination of bars of the usual type fitted into a holder 3b and locked in by wedges 3c. Holder 3b fits into cradle 3d. Attached to cradle 3d are back fall 6 and approach 7. Cradle 3d and plates 3a are supported and actuated by hydraulic pressure cylinders 4 and stablized circumferentially by means of connecting rods 47 pivoted at 47a to the bottom of cradle 3d. These rods 47 are interconnected with a torque shaft 48 pivotally connected to the beater frame, which aid in keeping the assembly 3 moving vertically in a line parallel with the face of the roll 1. Shaft 48 is supported in journals 47b which are anchored to the side walls of the beater frame.

Cylinders 4 contain plungers 4a for actuating bed plate box 3d. Oil manifolds 4b interconnect with cylinders 4. Oil pipes 4c connect manifolds 4d with a four-way valve 4d. Pipe 4e connects valve 4d with a hydraulic stock accumulator 51. An atmospheric relief or discharge line 4k extends to valve reservoir 4L. A discharge line 4h connects pressure pump 4j to accumulator 52. Pump 4j is a pressure pump driven from any suitable source. A suction line 4m extends from reservoir 4L to pump 4j.

In raising the bed plate filling 3 against the beater roll, valve 4d is set by hand so that fluid pressure from accumulator 51 passes through valve 4d, lines 4c, manifolds 4b to the under side of each piston 4a in hydraulic cylinders 4. At this position, line 4b which is connected to upper side of pistons 4a and through line 4c to valve 4d will be open and discharge through relief line 4k to reservoir 4L.

In lowering the filling 3, valve 4d is turned by hand to its number two position. This reverses the flow and causes the pressure to be applied to the top side of pistons 4a and relieve from their bottom side through manifold 4b and pipe 4c, valve 4d, and relief line 4k to reservoir 4L.

Adequate protection against shock loads is provided by means of the spring-loaded accumulator 51 installed in series with the cylinders 4, and hydraulic capacity is provided by means of the dead-weight volume accumulator 52. Both accumulators are of conventional type.

Hydraulic cylinder pistons 4a are connected to box 3d. Hydraulic cylinders 4 are supported on girders or other suitable supports 5 by means of a pin connection 4n serving to provide axial freeness of the cylinders 4 and pistons 4a as related to the bed plates 3a. Bed plates 3a are guided in ways and by torque rods 47 and shaft 48. Clearance and restricted closure is provided by means of an adjustable member 29 which may be adjusted against the approach casting 7 as desired. Adjustable side plates 53 serve to complete the closure between bed plate 3 and side walls of beater tub.

The tub is comprised of a storage and mixing stock chest 35, combined with a roll enclosure support and a return stock passage 12 and a stock chamber 13 beneath roll 1. A back fall 6 serves to deliver stock over a flexible apron 8 down a ramp 9, over a selector screen 37, to the storage and mixing chest 35. The stock in this chest is disintegrated, agitated, and circulated by means of a horizontal motor driven breaker type propeller 36 which is driven by a V-belt or other suitable drive from any suitable motor 54. Motor 54 preferably is a two speed motor, providing an agitator speed of 300 R. P. M. for breaking laps, and a low speed of 100 R. P. M. for circulating slush stock.

Two gates 38 and 39, which are externally controlled by means of geared handwheels and hydraulic cylinders 55 and serve to direct the stock to go either to stock chamber 13 through selector screen 37, when lap stock is being furnished, or interconnect the beating compartment with chest 35, when combined furnish is being beaten. The beating compartment may also be completely separated from the storage and mixing chest 35 when so desired for individual treatment of separate stocks by closing both gates 38 and 39.

The stock is thoroughly broken agitated and mixed in chest 35, delivered to the inrunning side of the roll by means of a centrifugal stock pump 18, which is connected with chest 35 by pipe 40 and valves 41, and 40a, thence through a regulating head box 20, thence to a distributing and sampling chamber 27, and thence to the inrunning side of the beater roll, being directed thereto by passing over plate 7 which forms an approach throat to roll 1.

In the arrangement shown (see Figs. 2, 3 and 4), I have provided an overflow compartment 21 from head box 20 to sump 17 by way of regulating weir 23 and pipe 24 and a regulated stock compartment 22 to sampling chamber 27 by way of regulating weir 25 and pipe 26 to chamber 27. I have also provided at 28 a stock distributing compartment to the approach 7.

A by-pass gate 11 in the back fall in advance of baffle 10 serves to allow stock to be recirculated in the return stock passage and to be isolated from the chest 35 when desired, thereby allowing two different stocks to be prepared separately and at proper time blended and further treated, if desired, as a composite furnish. With this arrangement it is not necessary that chamber 13 or chest 35 be filled completely, but lesser quantities may be furnished and preparation of the stock started as soon as the flow system including the pump 18 and piping is supplied with slush stock in sufficient quantities to assure a continuous delivery of the stock to the centrifugal pump 18 and the working area of the beater roll 1 and contacting bed plate 3.

Adequate control of the quantity circulated is provided by adjusting gates 23 and 25 in head box 20.

The entire chest and stock chamber is tile lined and at the areas about the roll, including sides and chambers, brass plate or linings are provided where necessary. The hood 14 is joined in part to allow for the removal and inspection of the bronze stock deflecting doctors 15 and 16.

One bronze hydraulically operated pump and by-pass valve 17a, and one hand operated wash-out valve 17b are provided. These are located in a sump 17 to which the circulating centrifugal stock pump 18 suction is connected. This pump 18 is designed to handle 100% rag half stuff.

The head box 20, distributing box 27, and overflow box 21 provide maximum trap for any extraneous material which may get into the furnish and can be easily cleaned and flushed out when required.

The mechanical energy required to hydrate and refine the stock furnish to a beater is necessarily converted into heat which is partially absorbed by the stock, and in part lost by radiation. The consequent rise in temperature of the stock is, or may be, sufficient to affect the later ability of the stock to properly combine with the chemicals admixed to the stock, such as size, alum, colors, clays, etc. Therefore, to produce the proper temperature range, it is desirable that this heat be removed without a removal of any of the stock or liquid making up the composite furnish. To accomplish this, a sufficient quantity of the stock delivered by pump 18, through pipe 19 is diverted through pipe 30 to stock thickener 31. Stock thickener 31 may be of a variety of designs, but for my purpose I have chosen a design, as follows, as best suited for accomplishing my results:

31a is a cylinder revolving on its axis (see Fig. 10) and supported on trunnion wheels 31b, and lined internally with wire mesh cloth 31c, or other foraminous material, sufficiently fine to prevent loss of fibre or other valuable material.

Co-acting interiorly with this cylinder is a rubber covered roll 31d which is actuated by its frictional contact with cylinder 31a, thereby serving as a press roll.

Stock from pipe 30 is delivered to the interior of cylinder 31a and spout 31e from which it overflows and is delivered to the in-running nip between wire mesh cloth 31c and roll 31d. The water contained by the stock is pressed out between cloth 31c and roll 31d and discharged into a receiving chamber 31f. The resulting dewatered stock which leaves the contact between cloth 31c and roll 31d and is pressed onto the screen cloth 31c is conveyed up and removed from said cloth by means of a doctor 31g and delivered to a screw conveyor 31h from whence it is discharged back to its original source. The effluent which has been discharged into chamber 31f is conducted therefrom through pipe 32 to heat exchanger 33, at which point the heat is absorbed by convection and from which the cooled effluent is discharged into pipe 34 and carried back to its original source, which may be either stock chamber 13 or chest 35.

The above described dewatering cylinder may also be used as a washing cylinder when and if such stock, as sulphite, is being treated and it is found necessary to wash out the remaining acids or chlorides which are commonly present in these grades of sulphite stocks and affect the use in the making of high-grade white papers.

The purpose of heat exchanger 33 is to lower the temperature of the fluids removed by the dewatering cylinder 31 and afford a means to cooling these waters which contain valuable dissolved parts of the stock and return these fluids to the original stock. With this method, it is unnecessary to supplement the stock with new water and the original consistency of stock in preparation is maintained at all times as well as the desired temperature of beating.

For the heat exchanger 33 to function, it is necessary that water of a lower temperature than the required final temperature of the liquid be supplied and discharged to carry away the heat absorbed. This cold water is supplied through line 33a and discharged through line 33b. Since no significant chemical change takes place because of the absorption of this heat by the cooling water, this water can be used in the general requirements of the plant.

The container for pulp to be treated in this machine comprises the circular chest 35 and the compartment or chamber 13 which are interconnected in such a manner that by means of gates 38 and 39 the stock contained in chest 35 may be allowed to flow into chamber 13, being directed into chamber 13 by passing through the selecting screen 37 and gate 38, or chamber 13 may be isolated from chest 35 by closing gates 38 and 39. With this arrangement it is possible to perform the functions of beating independently of the functions of disintegrating at one and the same time. These flows are diagrammatically shown in Figs. 11 to 15 inclusive.

Figure 14:
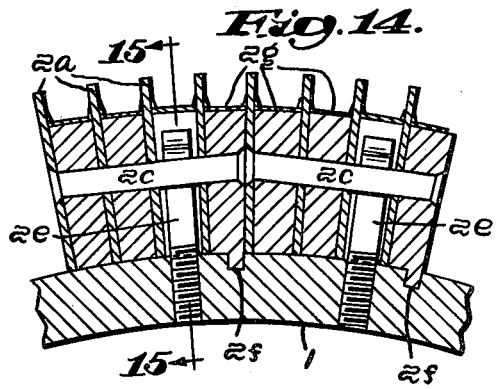

It is also possible to control the amount of concurrent beating by adjustment of doctor 15 and gate 11 effecting a partial circulation of the stock being treated through by-pass 12 to stock chamber 13. An adjustment of the overflow to box 21 and back to the suction supply 17 and to the pump 18 provides a balance of supply from chamber 13 equal to that overflowing from bypass 12. With this arrangement a shorter beating cycle will result and a consequent higher output capacity of the beater. In the above arrangement, stock gates 38 and 39 are closed, as shown in Figs. 14 and 15, and during this beating period a secondary stock, which may not require beating, such as shavings, soda pulp or the like, may be disintegrated in chest 35 by means of propeller 36 and prepared properly for combining with stock in chamber 13.

Such arrangement as described avoids the use of secondary beating equipment, as is customarily required, and provides a means of treating by beating and refining only that portion of a stock furnish as requires such beating and refining, thereby effecting an economic use of raw and secondary stock furnishes greater than is customarily possible.

The arrangement described does not preclude the use of these stock compartments 35 and 13 as a single unit which in certain cases might be desirable. Under this condition, doctor 15 would be adjusted into close relationship to roll 1, gate 11 would be adjusted to close passage 12, and stock would be discharged from roll over back fall 6 and in the customary way down discharge surface 9 to compartment 35 from whence, on being agitated by propeller 36, it would flow through compartment 13 to pump 18, as shown in Fig. 11.

The discharge from pump 18 would be regulated to allow the full capacity of the pump to be supplied through connections 20, 26, 27 and 28 under distributing doctor 16 to the in-running side of the beater roll. There would at all times be a portion of concurrent beating done equal to the difference between the capacity of roll 1 to pick up stock and the capacity of pump 18 to deliver stock to the roll.

Propeller 36 is a specially designed unit with an encasement, and is driven by an electric motor, or other power source, at two speeds. For a particular case, propeller 36 would be operated at 300 R. P. M. when performing the function of breaking up stock in chest 35, and at 100 R. P. M. when used for agitating purposes only. When used for breaking up stock and running at 300 R. P. M. the stock is sufficiently energized and directed against selective screen 37 that such portion of the stock as passes this screen is of a character which will be accepted by pump 18. Such portion as will not pass through screen 37 will be deflected by ramp 9 and returned to propeller 36 for additional breaking up, as shown in Fig. 12.

Pipe 40, connecting chest 35 with sump 17, affords a by-pass for stock which may have been treated separately in chest 35 and by adjustment of gate 41 be either transferred to compartment 13, as shown in Fig. 14, or afford a means by which this unit as a whole could function as a continuous beater, as shown in Fig. 12. Gate 41 and valve 17a are so related that when one valve is opened the other is automatically closed, and vice versa.

If the unit were operated as a continuous beater, the treated stock would be withdrawn from stock thickener 31 or from line 30 without passing through the thickener, and such amount as was thereby withdrawn would be replaced by furnishing new stock into chest 35 in equal amount. The type of design of this combined mechanical equipment and tub is such that all interior surfaces which contact any stock of a corrosive nature can be protected with an inert protective coating, such as tile, stainless steel, "neoprene" or like material which is inert to the acids, etc. in the stock.

The design of the roll, compartment 13 and distributing box 27 provides uniform distribution of stock across the face of roll 1, and a means whereby all stock fibres are subjected to an equal amount of treatment.

The unit for disintegrating the lapped pulp, shavings, waste paper and other material of a size which would not be accepted by a beater roll which was constructed in such a manner as to serve as a beating and refining unit of pulp comprises a propeller unit, designated generally at 36, a fixed unit with radial knives 36a, and a breaking unit 36b rotating with the propeller unit. Breaking unit 36b is arranged in such relation to the radial knives that it serves to bring the unbroken stock, pulp, or other material into close relationship thereto and produces disintegration and positive flow through the propeller from whence it is discharged against selector screen 37 for acceptance or rejection in reference to particle size.

While minor variations of the preferred embodiment herein shown will be apparent to those skilled in the art, it is not intended to limit the invention to the specific details of the construction shown but rather to measure it in terms of the appended claim.

Having thus described an illustrative example of my invention what I claim as new and desire to secure by Letters Patent of the United States is:

In a beater having a beater roll, bed plates, front approach to bed plates, back fall, a mixing and breaking chest, and a separate stock chamber, the following in combination; means for maintaining conditions of hydraulic shear constant despite wear including a cradle mounted for vertical movement towards and away from the beater roll, and the bed plates, front approach and back fall mounted on said cradle; hydraulic means for varying the cutting pressure between the beater roll and bed plates adapted to actuate said cradle vertically; means for controlling the temperature of the stock including a dewaterer and heat exchanger whereby extracted water from the stock may be cooled and then returned to the said mixing and breaking chest or the separate stock chamber; means for governing the proportions of stock being treated including ducts connecting each stock treating chamber with the other, and pumps to effect transfer of the stock through the ducts; an adjustable stock doctor for returning part of the stock over the beater roll to the bed plates; a circulation propeller positioned within the breaking and mixing chest and located adjacent to the stock chamber; controllable means for conducting the stock by gravity from the back fall into either the stock chamber or the breaking and mixing chest or impart to both; gate means controlling the interflow of stock between the said chamber and the said chest; a screened duct interconnecting the said chamber and the said chest and means for conveying stock under controlled volume from the chamber to the beater, from the chamber to the dewatering means, from the chest to the beater, and from the chest to the dewatering means.

GEORGE W. DODGE.

REFERENCES CITED

The following references are of record in the file of this patent:

UNITED STATES PATENTS

| Number | Name | Date |
|---|---|---|
| 771,403 | Wahlstrom | Oct. 4, 1904 |
| 1,199,161 | Crum | Sept. 26, 1916 |
| 1,273,982 | Allison | July 30, 1918 |
| 1,318,900 | Murphey et al. | Oct. 14, 1919 |
| 1,488,218 | Shartle | Mar. 25, 1924 |
| 1,811,741 | Bishop | June 23, 1931 |
| 1,859,890 | Richter et al. | May 24, 1932 |
| 1,925,922 | Hery | Sept. 5, 1933 |
| 1,949,998 | French | Mar. 6, 1934 |
| 2,055,142 | Bond | Sept. 22, 1936 |
| 2,055,143 | Bond | Sept. 22, 1936 |
| 2,126,264 | Knoll | Aug. 9, 1938 |
| 2,200,410 | Bond | May 14, 1940 |
| 2,456,249 | Bidwell | Dec. 14, 1948 |

FOREIGN PATENTS

| Number | Country | Date |
|---|---|---|
| 239 | Great Britain | of 1880 |
| 41,312 | Germany | Apr. 30, 1887 |